United States Patent [19]
Thomas

[11] 3,910,599
[45] Oct. 7, 1975

[54] HAND AND FOOT POWERED DRIVE SYSTEM FOR A VEHICLE

[76] Inventor: John C. Thomas, 2867 Harris St., Eugene, Oreg. 97405

[22] Filed: Nov. 15, 1974

[21] Appl. No.: 523,971

[52] U.S. Cl. .................. 280/234; 280/236; 280/264
[51] Int. Cl.² ................................... B62M 1/12
[58] Field of Search ............ 280/233, 234, 236–238, 280/250, 249, 264, 232

[56] References Cited
UNITED STATES PATENTS

| | | | |
|---|---|---|---|
| 2,390,719 | 12/1945 | Kurth | 280/234 |
| 3,193,305 | 7/1965 | Hendricks | 280/250 X |

FOREIGN PATENTS OR APPLICATIONS

| | | | |
|---|---|---|---|
| 515,317 | 1/1939 | United Kingdom | 280/233 |
| 743,559 | 1/1933 | France | 280/234 |
| 426,044 | 3/1935 | United Kingdom | 280/250 |

*Primary Examiner*—Kenneth H. Betts
*Attorney, Agent, or Firm*—James D. Givnan, Jr.

[57] ABSTRACT

An operator powered vehicle with a drive system utilizing arm and leg power, jointly or separately, to drive a jackshaft which drives a sprocket equipped hub of a driving wheel. The hub and wheel are journalled for independent rotation on a live axle which also serves to mount pedal arms and a sprocket in driving connection with the jackshaft. A hand crankshaft is in like connection with the jackshaft. Clutch means permit selective idling of either the foot pedals or hand cranks or joint driving engagement of both with the jackshaft. Arm and leg powered components are offset oppositely from an upright steering axis to minimize undesired residual torque acting about said axis.

5 Claims, 3 Drawing Figures

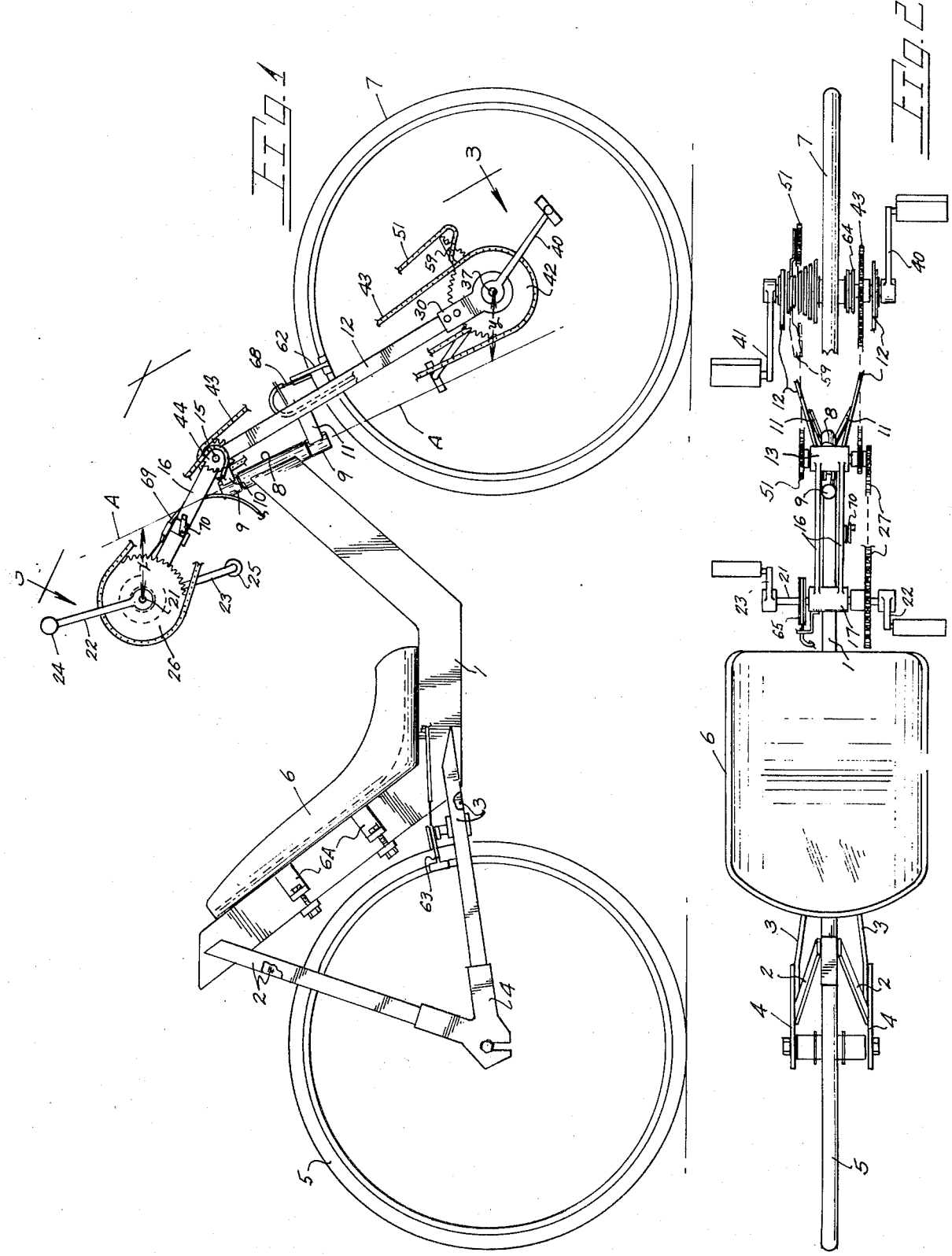

HAND AND FOOT POWERED DRIVE SYSTEM FOR A VEHICLE

BACKGROUND OF THE INVENTION

The present invention is embodied within a drive system permitting both arm and leg power of an operator to be selectively applied to the drive wheel or wheels of a vehicle.

Found in the known prior art are various arrangements, most often associated with bicycles, enabling the use of both the rider's arms and legs as a source of power. Significant problems have been disregarded in the known prior art arrangements in that provision has not been made to allow for convenient use of either the operator's arms or legs nor to overcoming resulting steering problems. The desirable use of supplemental arm power has been at the expense of a partial loss of steering control as normally manual effort is concerned with steering only. The prior art drive systems, of which I am aware, require continuous synchronized use of the operator's arms and legs which is highly undesirable on any vehicle and particularly those capable of some speed. Further, speed changing means are not found in the prior art relating to arm and leg powered vehicles to enable the operator to enjoy the important advantages of such means. Further, consideration to adequate brake systems is not evidenced by previous drive systems.

SUMMARY OF THE INVENTION

The present invention concerns a drive system for operator powered vehicles permitting the operator to power the vehicle with either leg or arm power or a combination of both as desired while at all times providing stable steering particularly important when the system is incorporated within a bicycle. Horizontal axes about which arm and leg power are imparted to the system are oppositely offset from an upright steering axis whereby torque acting about the steering axis is largely offset. Accordingly, hand steering effort about said axis need not overcome changing torque values imparted to the bicycle fork during pedal motion. A live front axle and sprocket thereon are powered by pedal arms with the sprocket in roller chain engagement powering a remote jackshaft assembly. Similarly, a hand crankshaft sprocket is also in driving engagement with the jackshaft. Both of the jackshaft mounted sprockets incorporate unidirectional clutches to permit powered rotation of the jackshaft by the operators's legs or arms, either jointly or separately. The jackshaft assembly is in driving connection with the hub of a vehicle wheel. The last mentioned driving connection may be routed through a shifting mechanism such as a derailleur system permitting engagement of a roller chain component with one of several cluster sprockets to provide a variable speed drive to the hub. A brake actuating member carried by the front axle includes an overrunning or unidirectional clutch which when rotated oppositely to driving rotation imparts reverse movement to a caliper brake cable actuating member for brake application. Similarly, the hand powered shaft is provided with a like brake actuating member also actuated by counter rotation of the hand crankshaft which causes engagement of clutch components to tension a second brake cable.

Important objects of the present invention include: the provision of a drive system for a vehicle powered by its rider which enables the joint or sole use of the rider's arms and legs as a source of power; the provision of a vehicle drive system powered by the operator's legs and arms incorporating a speed changing mechanism; the provision of a drive system including hand and foot actuated brake members for selectively or combined braking of wheel rotation upon counter rotation of foot pedal arms and hand cranks; the provision of a variable speed hub and sprocket cluster on a live axle powered by the operator's legs; and the provision of an indirect drive in which a jackshaft assembly includes clutch mounted sprockets.

BRIEF DESCRIPTION OF THE DRAWINGS

In the accompanying drawings:

FIG. 1 is a side elevational view of a bicycle embodying the present drive system, FIG. 2 is a plan view of FIG. 1.

DETAILED DESCRIPTION OF THE PREFERRED EMBODIMENT

Figure 3:
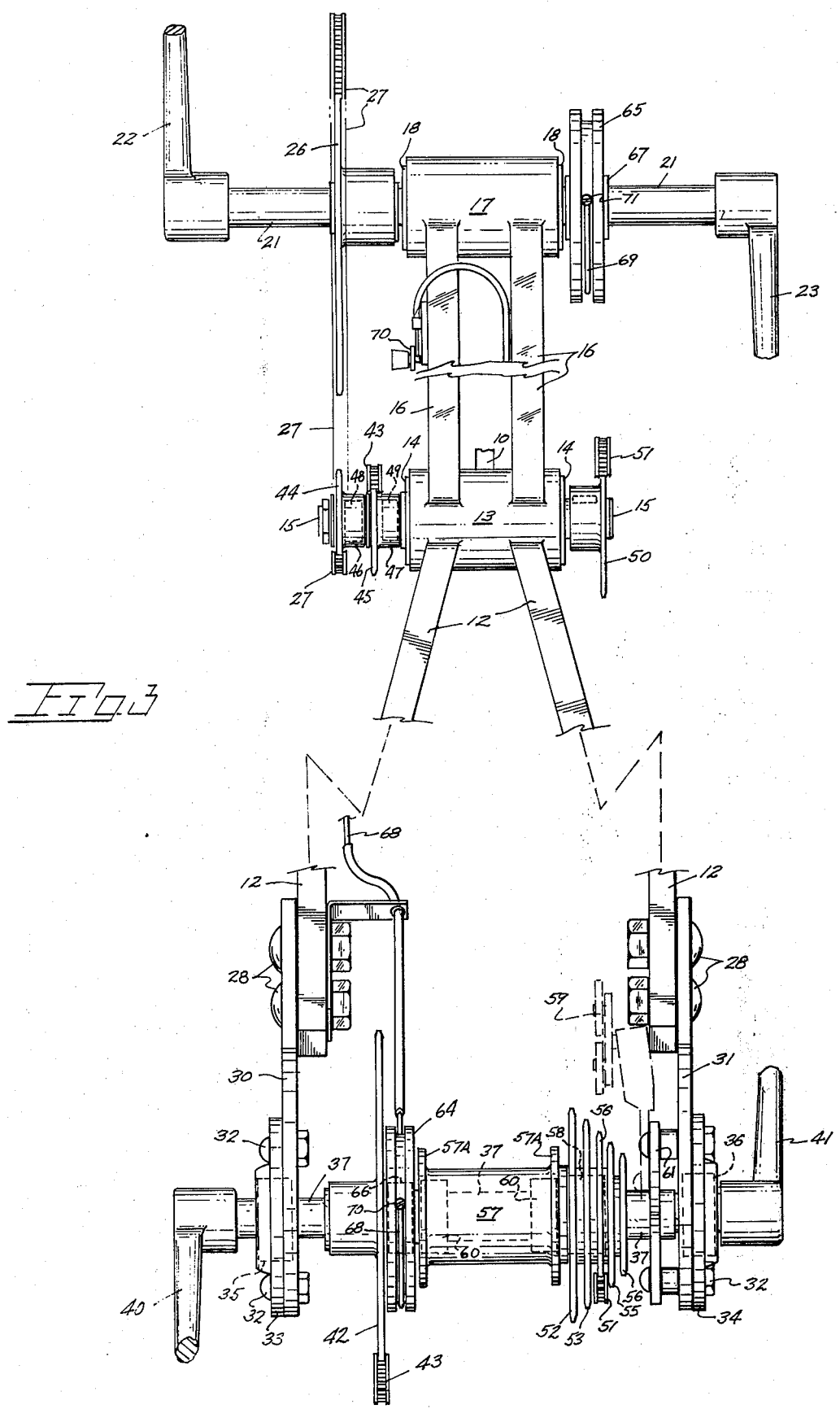
FIG. 3 is a front elevational view of the front fork of the bicycle and associated hand crank structure taken approximately along line 3—3 of FIG. 1 with fragments broken away for convenience of illustration.

With continuing reference to the accompanying drawings wherein applied reference numerals indicate parts similarly identified in the following specification, the reference numeral 1 indicates a bicycle frame comprising a main longitudinal member having pairs of arms 2 and 3 supporting a rear wheel bracket 4 and a rear wheel 5. A front wheel is indicated at 7. A seat 6 for an operator is adjustably anchored to the frame by brackets 6A. While a bicycle is disclosed, the present system, of course, is not restricted to a two wheeled vehicle.

The forward end of frame 1 terminates in securement to a head tube 8 within which is journalled fork pin components 9 attached by upper and lower fork supports 10 and 11 to a fork 12. A projected axis of the fork pin is indicated at A and constitutes a steering axis about which fork 12 moves during steering action.

With reference to FIG. 3, upper fork support 10 terminates forwardly in welded securement to a jackshaft shell 13 of a jackshaft assembly which houses bearings 14 within which is journalled a jackshaft 15. Supported by jackshaft shell 13 are upwardly inclined supports 16 which extend rearwardly beyond projected steering axis A and terminate in supporting attachment with a hand crank shell 17 housing bearings 18 within which is journalled hand crankshaft 21. Hand crank arms at 22 and 23 are equipped with suitable handles 24 and 25 permitting the application of torque to shaft 21 by operator arm motion. A sprocket at 26 is mounted on shaft 21 for rotation therewith to power a roller chain at 27.

Front fork 12 extends downwardly and forwardly from jackshaft shell 13 being interconnected therebelow to head pin component 9 by lower fork supports 11, the fork terminating downwardly whereat front wheel mounting plates 30 and 31 are attached by fastener assemblies 28. Each of said mounting plates is additionally apertured to receive fastener assemblies 32 which secure bearing flanges 33 and 34 to said plates, the flanges mounting bearings 35 and 36. Bearings 35, 36 journal a live axle 37 fitted at its ends with pedal arms 40 and 41 projecting oppositely from the axle.

Suitably secured on axle 37 for rotation therewith is a sprocket 42 about which is entrained a roller chain 43.

With attention again to the jackshaft assembly, a pair of sprockets at 44 and 45 on jackshaft 15 receive entrained segments of roller chains 27 and 43 with each of said pair of sprockets including unidirectional clutch mechanisms 48, 49 housed within their respective hubs 46, 47 for clutched engagement of said sprockets with the jackshaft. Accordingly, as viewed in FIG. 1 and from the left hand side of FIG. 3, clockwise rotation of hand crank sprocket 26 imparts clockwise rotation to jackshaft sprocket 44 and jackshaft 15 while similarly clockwise rotation of axle mounted sprocket 42 imparts clockwise rotation to jackshaft sprocket 45 and jackshaft 15. The unidirectional clutches 48, 49 within sprocket hubs 46 and 47 permit either of the paired jackshaft sprockets 44 or 45 to idle about the rotating jackshaft when the latter is driven by the remaining sprocket of the pair. A suitable unidirectional clutch is a roller clutch bearing manufactured by the Torrington Company and identified by part number RC-081208.

The indirect drive arrangement for front wheel 7 further includes a jackshaft mounted sprocket 50 for powering of a roller chain 51 driving front wheel 7. Desirably, though not necessarily, chain 51 is associated with a speed changing mechanism such as, for example, the well known derailleur type as at 59 enabling selective engagement of chain 51 with a sprocket of a sprocket cluster 52 through 56. The function of the variable speed mechanism is to impart different rotational speeds to a front wheel hub 57 flanged at 57A to receive inner spoke ends in the conventional manner. The series of sprockets 52-56 are secured to hub 57 by means of a threaded hub extension 58 with which the sprockets are threadedly engaged permitting any one of the last mentioned sprockets to impart rotation to hub 57 in the conventional sprocket cluster manner. Bearings at 60 within said hub rotatably mount the latter on live axle 37 permitting concentric, independent rotation of hub 57 on live axle 37. Derailleur type chain shifter 59 is shown in outline in broken lines and includes a pair of laterally shiftable sprockets about which chain 51 travels. The shiftable sprockets of the shifter device are positioned by a control cable which acts against spring biasing means to locate the shifter sprockets in alignment with cluster sprocket 56.

Steering control of front fork 12 is greatly enhanced by the offsetting, in opposite directions at x and y, hand crankshaft 21 and live axle 37 from steering axis A whereby residual torque imparted to the fork by arm and leg imparted motive forces, counteract one another resulting in only normal steering effort being required.

While a specific variable speed mechanism is above mentioned it is to be understood that the present system is not limited to any particular ratio changing mechanism but rather may be used with other such mechanisms or utilized simply as a single speed drive system with but one hub mounted sprocket. Further, the incorporation of a second chain shifter of the type above mentioned, adjacent jackshaft 15 along with the addition of a companion sprocket on jackshaft 15 having a different number of teeth then sprocket 50 will enable the operator to select one of ten sprocket and chain drive combinations. In instances where a derailleur mechanism is used adjacent front wheel hub 57, a mounting plate at 61 is secured in place to fork plate 31 and serves as a stationary mount for the derailleur mechanism shown in dashed lines.

For actuating caliper brakes 62, 63 associated with front and rear wheels 7 and 5, I provide cable tensioning brake members at 64 and 65 (FIG. 3) mounted respectively on axle 37 and hand crankshaft 21 by means of unidirectional clutches 66 and 67 housed within said members. Flexible cables at 68 and 69 are secured at their ends by fastener elements 70 and 71 to permit partial, counterclockwise rotation (as viewed from the left hand side of FIG. 3) of circular members 64 and 65 to tension said cables. Cable 69 is suitably routed along frame member 1 and terminates in attachment with a rear wheel caliper brake 63 while cable 68 is routed upwardly along a fork member 12 and terminates in attachment to a front wheel caliper brake 62. The caliper brake mechanisms may be of the conventional type including arm carried, rim-gripping pads which are spring biased to a rim release position in the absence of cable tension. To apply either the rear or front wheel brakes or both simultaneously, counterclockwise rotation of crankshaft 21 and axle 37 by the operator's arms and legs causes engagement of clutch components of clutches 67 and 66 whereupon rotation is imparted to arcuate brake members 64 and 65 to tension their respective brake cables. For controlling the derailleur chain shifting mechanism 59, a lever at 70 is attached to a control cable which terminates in actuating connection with derailleur unit 59.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A drive system for a vehicle enabling use of an operator's arms and legs to provide a source of motive power jointly or separately to a powered vehicle wheel, said system comprising, a live axle and sprocket combination adapted for rotation by the operator's legs, a hub and wheel rotatably journalled on said axle, a jackshaft assembly including a jackshaft with mutliple sprockets thereon, a hand crankshaft and sprocket combination adapted for rotation by the operator's arms, unidirectional clutch means associated with at least some of said sprockets and having clutch components engageable during rotation in one direction and operable to impart powered rotation to said jackshaft and to at least one of said jackshaft sprockets while permitting overrunning of clutch components in an opposite direction of rotation, and power transmission means interconnecting said one of said jackshaft sprockets and said axle journalled hub and wheel to impart rotation to same.

2. The invention as claimed in claim 1 wherein said live axle constitutes the front wheel axle of a bicycle having a fork forwardly offset from an upright steering axis, and said crankshaft and sprocket combination are offset rearwardly from said steering axis for purposes of neutralizing residual torque imparted to the fork about said axis by the operator's arms and legs.

3. The invention as claimed in claim 2 wherein said power transmission means includes speed changing means to vary the rotational speed of said hub relative to jackshaft speed.

4. The invention as claimed in claim 1 additionally including a caliper brake cable actuating member, clutch means intermediate said brake member and said live axle, said clutch means operable to engage said actuating member with the axle upon rotation of the axle in a directiion opposite to normal rotation whereby rotational movement is imparted to said actuating member to tension the brake cable.

5. The invention as claimed in claim 4 additionally including a second brake actuating member, clutch means intermediate said second brake actuating member and said hand crankshaft, said clutch means operable to engage the last mentioned brake member with the crankshaft upon rotation of the hand crankshaft opposite to the normal rotation whereby rotational movement is imparted to said second actuating member to tension the brake cable.

* * * * *